United States Patent
Jiang et al.

(10) Patent No.: US 8,391,233 B2
(45) Date of Patent: Mar. 5, 2013

(54) METHOD FOR MAPPING DOWNLINK DEDICATED PILOTS TO RESOURCE ELEMENTS IN EXTENDED CYCLIC PREFIX FRAME STRUCTURE

(75) Inventors: Jing Jiang, Shenzhen (CN); Guanghui Yu, Guangdong (CN); Hui Yu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 276 days.

(21) Appl. No.: 12/671,389

(22) PCT Filed: Dec. 25, 2008

(86) PCT No.: PCT/CN2008/073714
§ 371 (c)(1),
(2), (4) Date: Jan. 29, 2010

(87) PCT Pub. No.: WO2009/114983
PCT Pub. Date: Sep. 24, 2009

(65) Prior Publication Data
US 2010/0142476 A1    Jun. 10, 2010

(30) Foreign Application Priority Data
Mar. 20, 2008  (CN) .......................... 2008 1 0085767

(51) Int. Cl.
*H04W 4/00*   (2009.01)
(52) U.S. Cl. ........................................................ 370/330
(58) Field of Classification Search .................. None
See application file for complete search history.

(56) References Cited

U.S. PATENT DOCUMENTS
2008/0212462 A1 *  9/2008  Ahn et al. ..................... 370/209
(Continued)

FOREIGN PATENT DOCUMENTS
CN    1889554 A    1/2007
CN    101227232 A    7/2008
(Continued)

OTHER PUBLICATIONS

International Search Report in international application No. PCT/CN2008/073714, mailed Mar. 26, 2009.
(Continued)

*Primary Examiner* — Chi Pham
*Assistant Examiner* — Mohammad Adhami
(74) *Attorney, Agent, or Firm* — Oppedahl Patent Law Firm LLC

(57) ABSTRACT

A method for mapping downlink dedicated pilots to resource elements in an Extended Cyclic Prefix frame structure, applied in a long term evolution system, includes the following steps: the first downlink dedicated pilot of each port is mapped to the specific position of a physical resource block; other downlink dedicated pilots of the port are mapping-processed according to the time-domain interval, frequency-domain interval and a preset regulation; the time-domain interval is two or three OFDM symbols, and the frequency-domain interval is two subcarriers of the same time domain. By defining the positions of pilots in the physical resource block, downlink dedicated pilots can obtain the information of all channels when a base station uses a beamforming of more than four antennas. Making the channel information obtained by dedicated pilots contain the real channel information and the process-weight-value of a beamforming, a UE does not need to obtain the transmission-weight-value of a beamforming, thereby avoiding the feedback overhead of beamforming weight-values.

6 Claims, 5 Drawing Sheets

U.S. PATENT DOCUMENTS

| | | | |
|---|---|---|---|
| 2009/0225888 A1* | 9/2009 | Noh et al. | 375/267 |
| 2010/0046356 A1* | 2/2010 | Chun et al. | 370/208 |
| 2010/0103906 A1* | 4/2010 | Montojo et al. | 370/335 |

FOREIGN PATENT DOCUMENTS

| | | |
|---|---|---|
| JP | 2007536803 A | 12/2007 |
| JP | 2007538477 A | 12/2007 |
| JP | 2008526126 A | 7/2008 |
| KR | 1020050040058 A | 5/2005 |
| WO | 2007024935 A2 | 3/2007 |
| WO | 2008004629 A | 1/2008 |

OTHER PUBLICATIONS

Dedicated RS Pattern for DL Beamforming R1-080217, Jan. 14, 2008.

Dedicated RS Pattern for DL Beamforming R1-074561, Nov. 15, 2007.

English Translation of the Written Opinion of the International Search Authority in international application No. PCT/CN2008/073714, mailed on Mar. 26, 2009.

Dedicated Reference Symbol Patterns.

* cited by examiner

METHOD FOR MAPPING DOWNLINK DEDICATED PILOTS TO RESOURCE ELEMENTS IN EXTENDED CYCLIC PREFIX FRAME STRUCTURE

TECHNICAL FIELD

The present invention relates generally to the field of wireless communications, and relates more specifically to a method for mapping downlink dedicated pilots to resource elements in Extended Cyclic Prefix (Extended CP) frame structure in a Long Term Evolution (LTE) system.

BACKGROUND

In the $3^{rd}$ Generation Partnership Project (3GPP) TS 36.211 which is an existing version of the Long Term Evolution (LTE) standard, a single layer beamforming technique is supported. In a conventional beamforming, more than 6 transmitting antennas are usually used, however, only four ports cell-specific reference signals are defined in the existing version of the LTE standard, and are adopted in practical application, and channel information of each antenna port is extracted by a corresponding cell-specific reference signals, therefore, it is impossible to acquire the real channel information of each antenna with more than 4 antennas configuration.

If the number of cell-specific reference signal is increased, for example if 6 to 8 antenna ports are used for cell-specific reference signals, then the overhead of reference signals will be quite great, and there will be a difference in real channel information estimated by uplink/downlink, so the beamforming weight-value feedback information is still needed to be estimated on the real channel information.

SUMMARY

In view of the above-mentioned problems that, when more than 4 antennas are adopted at the base station for beamforming, it is impossible to acquire all desired channel information from cell-specific reference signals, and that there is a feedback overhead of beamforming weight-value, the present invention provides a method for mapping downlink dedicated pilots to resource elements in Extended CP frame structure, so as to support a beamforming with lower overhead and superior performance.

To solve the above-mentioned technical problems, the method for mapping downlink dedicated pilots to resource elements in Extended CP frame structure in the present invention, applied in the LTE system, comprises the following steps:

mapping the first downlink dedicated pilot of each port to the specific position of a physical resource block;

mapping-processing other downlink dedicated pilots of the port according to a time-domain interval, a frequency-domain interval and a preset regulation; the time-domain interval is two or three Orthogonal Frequency Division Multiplexing (OFDM) symbols, and the frequency-domain interval is two subcarriers of the same time domain.

Further, the preset regulation is: twelve subcarriers are mapped to a physical resource block in the frequency domain, four downlink dedicated pilots are mapped in a same time domain, and the dedicated pilots are two subcarriers apart.

Further, only one port of downlink dedicated pilots is transmitted in a physical resource block.

Further, the corresponding time-domain position of the specific position is the $5^{th}$ orthogonal frequency division multiplexing symbol, and the corresponding frequency-domain position thereof is the same subcarrier of the first column of cell-specific reference signals in a physical resource block.

Further, a physical resource block comprises twelve subcarriers in the frequency domain, and twelve orthogonal frequency division multiplexing symbols in the time domain, and the mapping method comprises specifically:

mapping the first downlink dedicated pilot to the $5^{th}$ orthogonal frequency division multiplexing symbol in the time domain, and to the $A^{th}$ subcarrier in the frequency domain; mapping the second downlink dedicated pilot to the $5^{th}$ orthogonal frequency division multiplexing symbol in the time domain, and to the $(A+3)^{th}$ subcarrier in the frequency domain; mapping the third downlink dedicated pilot to the $5^{th}$ orthogonal frequency division multiplexing symbol in the time domain, and to the $(A+6)^{th}$ subcarrier in the frequency domain; mapping the fourth downlink dedicated pilot to the $5^{th}$ orthogonal frequency division multiplexing symbol in the time domain, and to the $(A+9)^{th}$ subcarrier in the frequency domain;

mapping the fifth downlink dedicated pilot to the $8^{th}$ orthogonal frequency division multiplexing symbol in the time domain, and to the $B^{th}$ subcarrier in the frequency domain; mapping the sixth downlink dedicated pilot to the $8^{th}$ orthogonal frequency division multiplexing symbol in the time domain, and to the $(B+3)^{th}$ subcarrier in the frequency domain; mapping the seventh downlink dedicated pilot to the $8^{th}$ orthogonal frequency division multiplexing symbol in the time domain, and to the $(B+6)^{th}$ subcarrier in the frequency domain; mapping the twelfth downlink dedicated pilot to the $8^{th}$ orthogonal frequency division multiplexing symbol in the time domain, and to the $(B+9)^{th}$ subcarrier in the frequency domain;

mapping the ninth downlink dedicated pilot to the $12^{th}$ orthogonal frequency division multiplexing symbol in the time domain, and to the $C^{th}$ subcarrier in the frequency domain; mapping the tenth downlink dedicated pilot to the $12^{th}$ orthogonal frequency division multiplexing symbol in the time domain, and to the $(C+3)^{th}$ subcarrier in the frequency domain; mapping the eleventh downlink dedicated pilot to the $12^{th}$ orthogonal frequency division multiplexing symbol in the time domain, and to the $(C+6)^{th}$ subcarrier in the frequency domain; mapping the eighth downlink dedicated pilot to the $12^{th}$ orthogonal frequency division multiplexing symbol in the time domain, and to the $(C+9)^{th}$ subcarrier in the frequency domain.

Wherein, B and C are 1 or 2 or 3.

Further, there are multiple ports of downlink dedicated pilots in a physical resource block, and the specific time-domain positions to which each port of downlink dedicated pilots is mapped in a physical resource block are located at the $5^{th}$ orthogonal frequency division multiplexing symbol of the physical resource block, while the specific frequency-domain positions to which each port of downlink dedicated pilots is mapped in a physical resource block are staggered from each other.

Further, a physical resource block comprises twelve subcarriers in the frequency domain, and twelve orthogonal frequency division multiplexing symbols in the time domain, and the mapping method comprises specifically:

dividing a port of twelve downlink dedicated pilots into three groups, each group comprising four downlink dedicated pilots that are located at the same orthogonal frequency division multiplexing symbol;

in the time domain, mapping the first group of downlink dedicated pilots to the $5^{th}$ orthogonal frequency division multiplexing symbol in the time domain; the second group of downlink dedicated pilots mapped to the $8^{th}$ orthogonal frequency division multiplexing symbol in the time domain; the third group of downlink dedicated pilots mapped to the $11^{th}$ or $12^{th}$ orthogonal frequency division multiplexing symbol in the time domain;

in the frequency domain, mapping the $1^{st}$ one of four downlink dedicated pilots of each group to the $1^{st}$, $2^{nd}$ or $3^{rd}$ subcarrier in the frequency domain, and mapping the $2^{nd}$ to $4^{th}$ downlink dedicated pilots to subcarriers that are two subcarriers apart from each other in order in the frequency domain.

Further, a physical resource block comprises twelve subcarriers in the frequency domain, and twelve orthogonal frequency division multiplexing symbols in the time domain, and the mapping method comprises specifically:

dividing a port of twelve downlink dedicated pilots into three groups, each group comprising four downlink dedicated pilots that are located at the same orthogonal frequency division multiplexing symbol;

in the time domain, mapping the first group of downlink dedicated pilots to the $5^{th}$ orthogonal frequency division multiplexing symbol in the time domain; mapping the second group of downlink dedicated pilots to the $9^{th}$ orthogonal frequency division multiplexing symbol in the time domain; and mapping the third group of downlink dedicated pilots to the $12^{th}$ orthogonal frequency division multiplexing symbol in the time domain;

in the frequency domain, mapping the $1^{st}$ downlink dedicated pilot of each group of 4 downlink dedicated pilots to the $1^{st}$, $2^{nd}$ or $3^{rd}$ subcarrier in the frequency domain, and mapping the $2^{nd}$ to $4^{th}$ downlink dedicated pilots to subcarriers that are 2 subcarriers apart from each other in order in the frequency domain.

Further, the $1^{st}$, $2^{nd}$, $3^{rd}$, $4^{th}$ downlink dedicated pilots are all mapped to the $5^{th}$ OFDM symbol in the time domain, and to the $1^{st}$, $4^{th}$, $7^{th}$, $10^{th}$ subcarriers sequentially in the frequency domain;

the $5^{th}$, $6^{th}$, $7^{th}$, $8^{th}$ downlink dedicated pilots are all mapped to the $8^{th}$ OFDM symbol in the time domain, and to the $1^{st}$, $4^{th}$, $7^{th}$, $10^{th}$ subcarriers sequentially in the frequency domain, or to the $3^{rd}$, $6^{th}$, $9^{th}$, $12^{th}$ subcarriers sequentially in the frequency domain;

the $9^{th}$, $10^{th}$, $11^{th}$, $12^{th}$ downlink dedicated pilots are all mapped to the $11^{th}$ or $12^{th}$ OFDM symbol in the time domain, and to the $1^{st}$, $4^{th}$, $7^{th}$, $10^{th}$ subcarriers sequentially in the frequency domain.

Further, $1^{st}$, $2^{nd}$, $3^{rd}$, $4^{th}$ downlink dedicated pilots are all mapped to the $5^{th}$ OFDM symbol in the time domain, and to $1^{st}$, $4^{th}$, $7^{th}$, $10^{th}$ subcarriers sequentially in the frequency domain;

the $5^{th}$, $6^{th}$, $7^{th}$, $8^{th}$ downlink dedicated pilots are all mapped to the $8^{th}$ OFDM symbol in the time domain, and to the $2^{nd}$, $5^{th}$, $8^{th}$, $11^{th}$ subcarriers sequentially in the frequency domain;

the $9^{th}$, $10^{th}$, $11^{th}$, $12^{th}$ downlink dedicated pilots are all mapped to the $11^{th}$ or $12^{th}$ OFDM symbol in the time domain, and to the $3^{rd}$, $6^{th}$, $9^{th}$, $12^{th}$ subcarriers sequentially in the frequency domain.

Further, the $1^{st}$, $2^{nd}$, $3^{rd}$, $4^{th}$ downlink dedicated pilots are all mapped to the $5^{th}$ OFDM symbol in the time domain, and to the $1^{st}$, $4^{th}$, $10^{th}$ subcarriers sequentially in the frequency domain;

the $5^{th}$, $6^{th}$, $7^{th}$, $8^{th}$ downlink dedicated pilots are all mapped to the $9^{th}$ OFDM symbol in the time domain, and to the $3^{rd}$, $6^{th}$, $9^{th}$, $12^{th}$ subcarriers sequentially in the frequency domain;

the $9^{th}$, $10^{th}$, $11^{th}$, $12^{th}$ downlink dedicated pilots are all mapped to the $12^{th}$ OFDM symbol in the time domain, and to the $1^{st}$, $4^{th}$, $7^{th}$, $10^{th}$ subcarriers sequentially in the frequency domain.

To sum up, the present invention can bring the following beneficial effects:

(1) by clarifying the position of a pilot symbol in a physical resource block, the problem that, when more than four antennas are adopted at a base station for beamforming, the cell-specific reference signals cannot acquire all channel information according to existing version of the LTE standard, is solved;

(2) by making the channel information obtained by dedicated pilots contain the real channel information and the process-weight-value of a beamforming, it is not necessary for UE to obtain the beamforming transmission-weight-value, and it is possible to avoid the feedback overhead of the beamforming weight-values;

(3) in addition, the design of the start position of dedicated pilots in the time domain raised in this method is more reasonable than that raised in previous dedicated pilot mapping methods, with superior performance based on the same overhead of reference signals;

(4) since the start position of a dedicated pilot in the frequency domain is right next to that of a cell-specific reference signals, it is convenient to guarantee consistency of position between channel information extraction and application, so as to reduce accumulated error;

(5) since dedicated pilots are distributed evenly in both the time domain and the frequency domain, the quality of channel estimation is guaranteed.

BRIEF DESCRIPTION OF THE DRAWINGS

The present invention will be further illustrated in detail with reference to the drawings and specific embodiments hereinafter.

 denotes a cell-specific reference signals transmitted by antenna port 0;

 denotes a cell-specific reference signals transmitted by antenna port 1;

 denotes a cell-specific reference signals transmitted by antenna port 2;

 denotes a cell-specific reference signals transmitted by antenna port 3;

 denotes a resource element.

Figure 2:
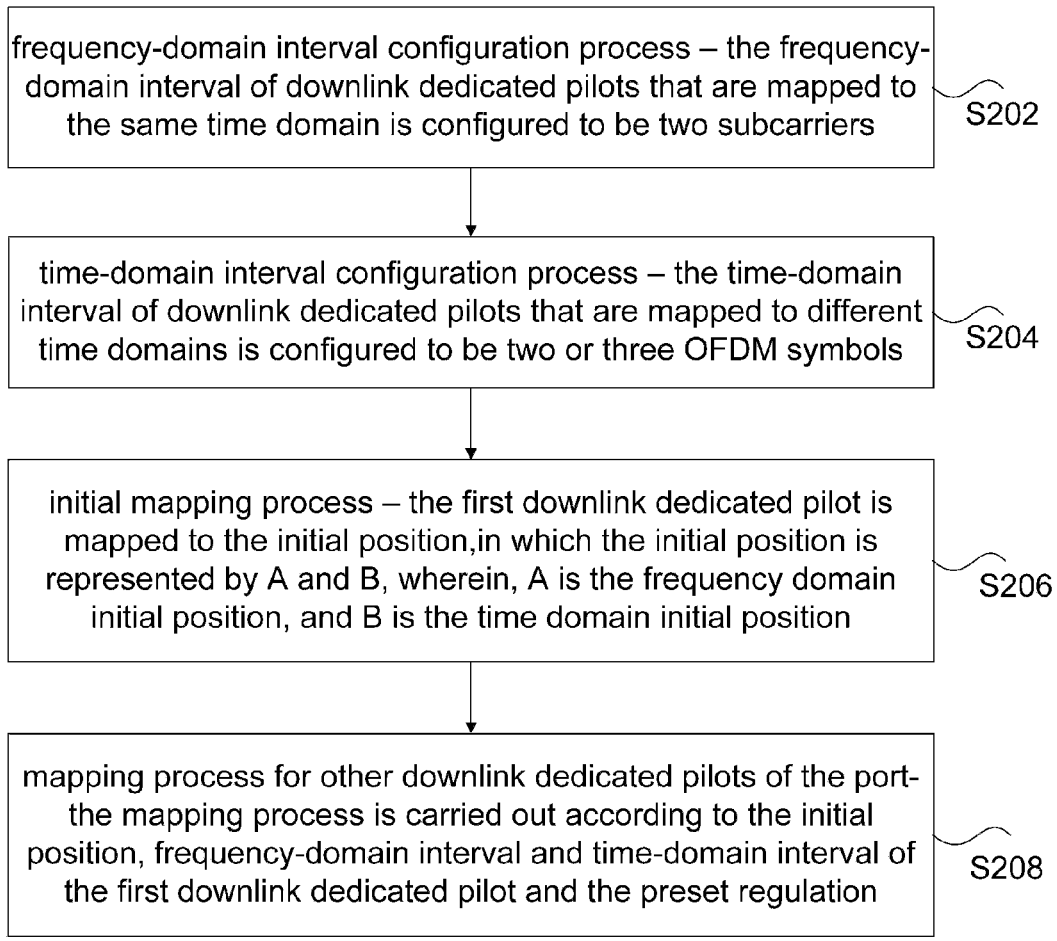
Figure 3:
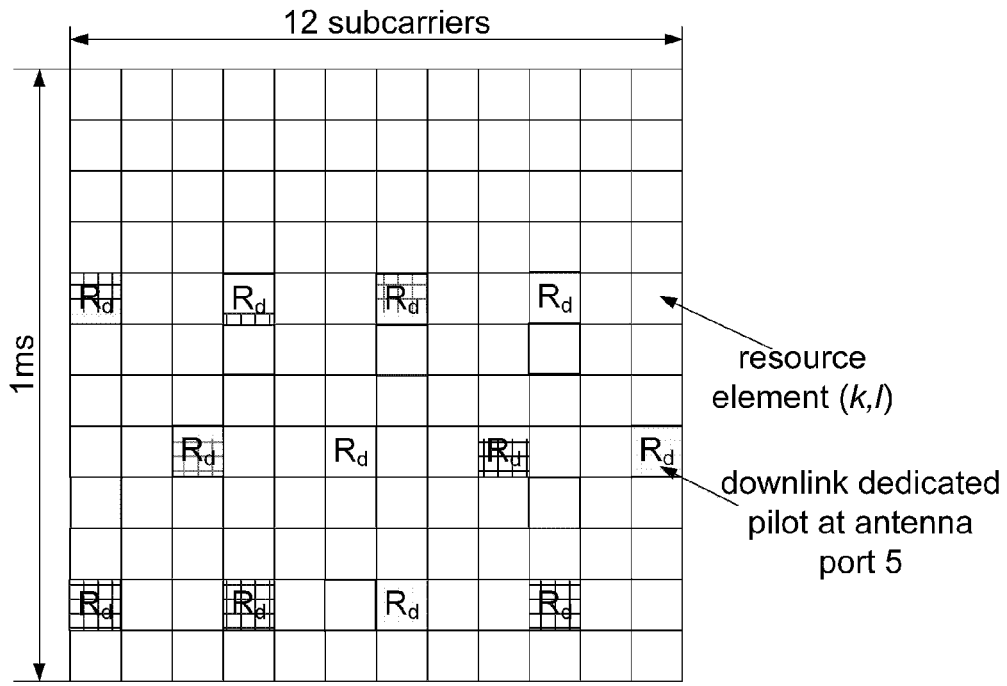
Figure 4:
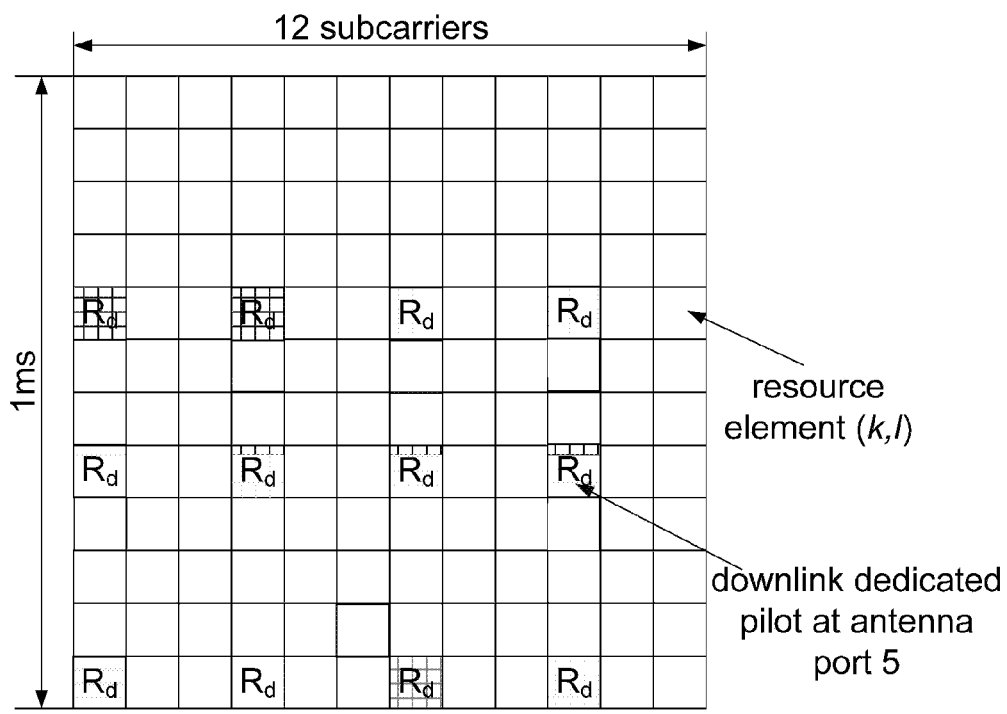
Figure 5:
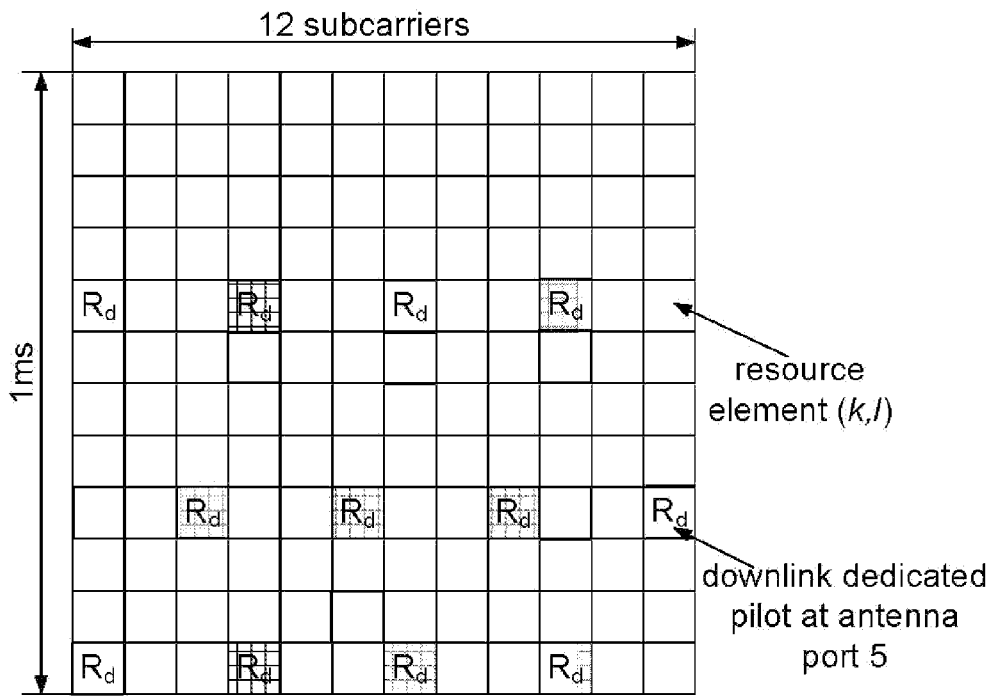
Figure 6:
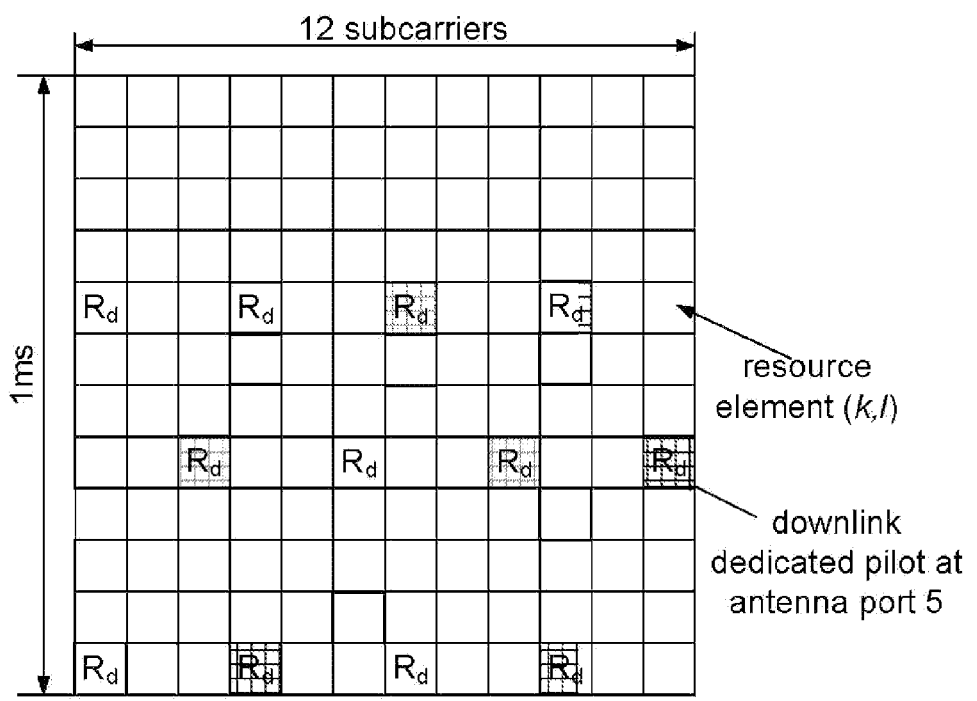
Figure 7:
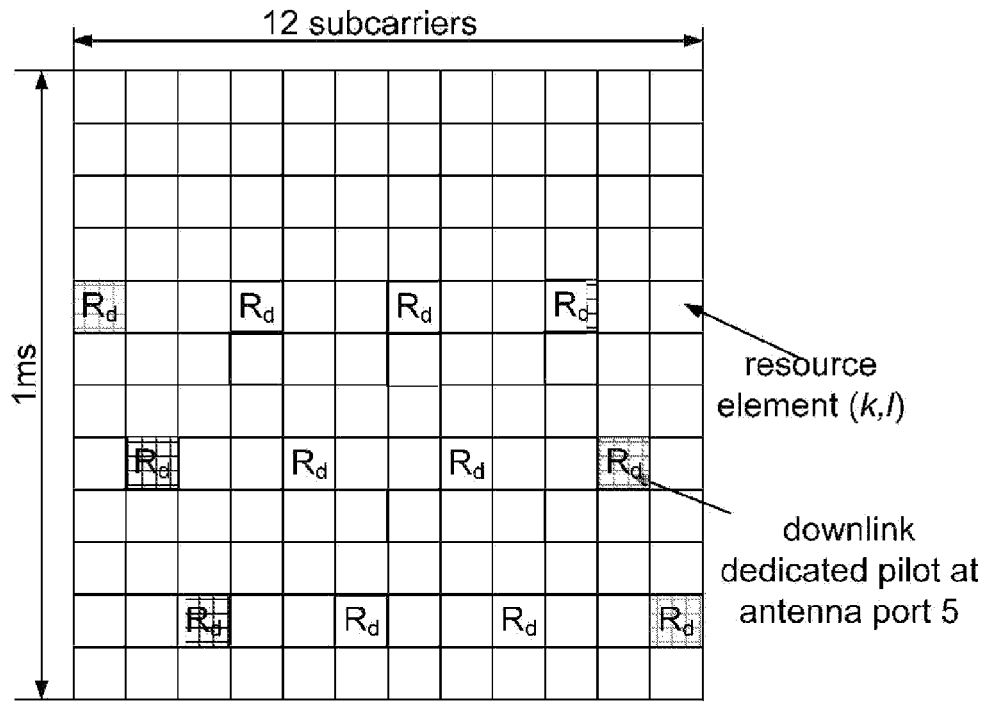
Figure 8:
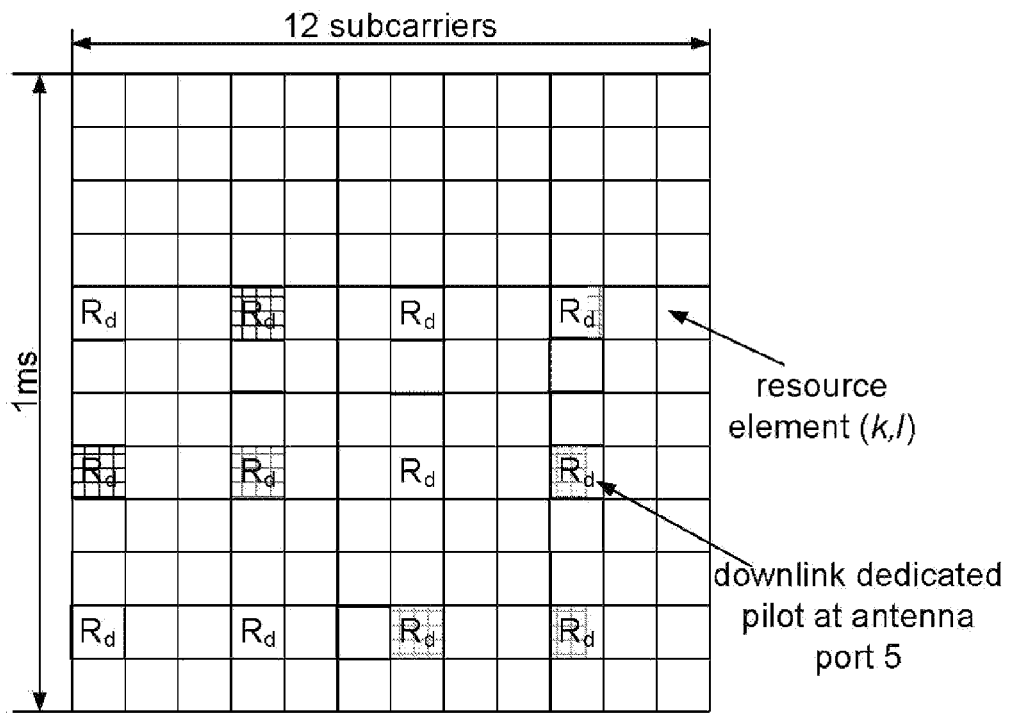

FIG. 2 is a flowchart illustrating the method of mapping downlink dedicated pilots to resource elements according to an embodiment of the present invention;

FIG. 3 is a diagram illustrating embodiment 1 of the method shown in FIG. 2;

FIG. 4 is a diagram illustrating embodiment 2 of the method shown in FIG. 2;

FIG. 5 is a diagram illustrating embodiment 3 of the method shown in FIG. 2;

FIG. 6 is a diagram illustrating embodiment 4 of the method shown in FIG. 2;

FIG. 7 is a diagram illustrating embodiment 5 of the method shown in FIG. 2;

FIG. 8 is a diagram illustrating embodiment 6 of the method shown in FIG. 2.

From FIG. 3 to FIG. 8, 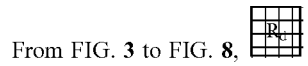 denotes a downlink dedicated pilot; □ denotes a resource element.

DETAILED DESCRIPTION

In the existing version of the LTE standard, when more than 4 antennas are adopted at the base station for beamforming, the cell-specific reference signals cannot acquire all channel information, and there is a problem of the feedback overhead of beamforming weight-values. Considering that downlink dedicated pilots of a beamforming are weigh-processed by multiple antennas, it is applicable to incorporate multiple transmitting antennas into one antenna port by way of a weigh-process upon the multiple antennas, namely channel information of all transmitting antennas can be estimated through only one port of downlink dedicated pilots, and the downlink dedicated pilots can estimate channel information that is weigh-processed by multiple antennas, so adopting downlink dedicated pilots is a scheme of low overhead and good performance.

By clarifying the position of a pilot symbol in a physical resource block in the present invention, it is defined at which positions of the Extended CP frame structure in the LTE system should the downlink dedicated pilots be sent, and how the time-domain interval and frequency-domain interval are arranged, so that operation of downlink dedicated pilots in an LTE system is provided with a foundation, and the existing LTE version can support a beamforming with lower overhead and superior performance when applying the dedicated pilot design according to embodiments of the present invention. The above-mentioned Extended CP frame structure may be a resource block (RB) which comprises twelve subcarriers in the frequency domain, and twelve OFDM symbols in the time domain.

In addition, the method for mapping downlink dedicated pilots to resource elements in a Normal Cyclic Prefix (Normal CP) frame structure was defined at the 52$^{nd}$ meeting of the LTE Standard, on this basis, according to the conclusion of the meeting, the present invention provides a method for mapping downlink dedicated pilots to resource elements in Extended CP frame structure, the method being of low overhead and having good performance.

Figure 1:
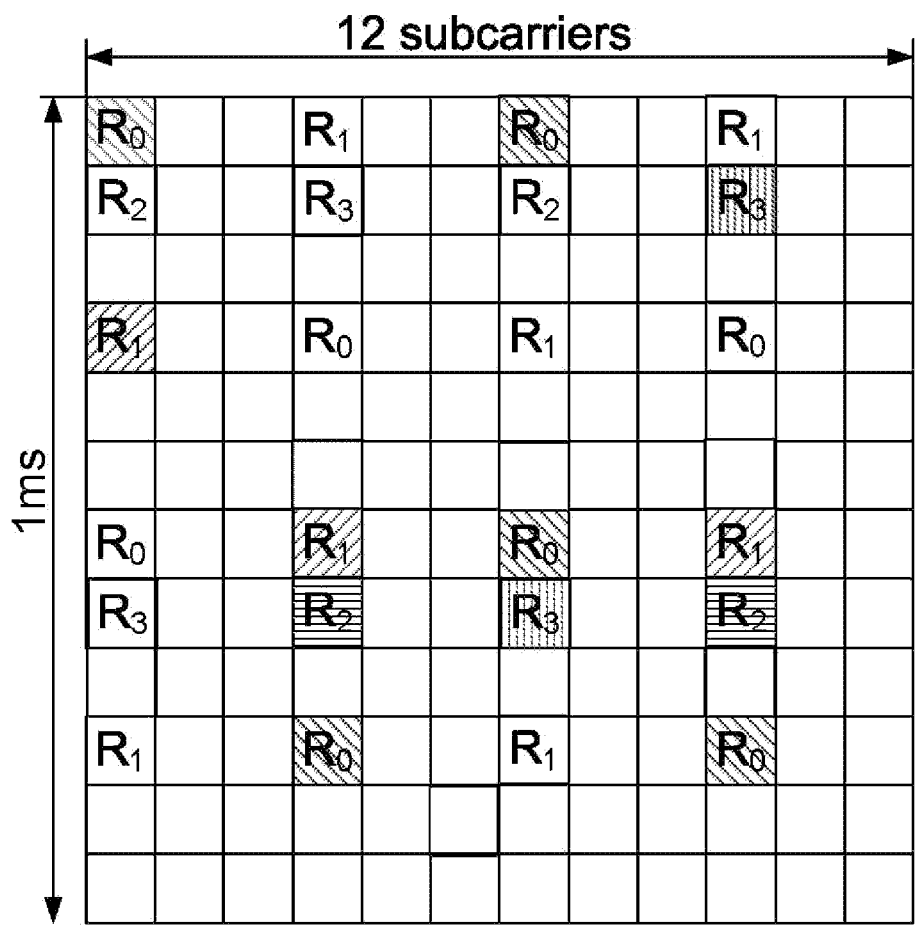
FIG. 1 is a diagram illustrating a physical resource block that adopts the first two ports of cell-specific reference signals, according to the Extended CP frame structure regulated in 3GPP TR 36.211; in this figure.

According to the method for mapping downlink dedicated pilots to resource elements in Normal CP frame structure defined at the 52$^{nd}$ meeting of LTE Standard, when downlink dedicated pilots of a beamforming are adopted, four ports cell-specific reference signals are inserted for all-around detection of control channels, and the mapping relation between the four ports cell-specific reference signals and the minimum physical resource block is shown in FIG. 1. FIG. 1 shows the cell-specific reference signals and resource elements respectively transmitted by antenna ports 0 to 3.

Exemplary embodiments of the present invention will be described with reference to accompanying drawings hereinafter, and it should be understood that, the described exemplary embodiments are only used to describe and illustrate, rather than limit the present invention:

FIG. 2 is a flowchart illustrating the method of mapping downlink dedicated pilots to resource elements in Extended CP frame structure according to the present invention, which comprises the following steps:

step S202: frequency-domain interval configuration process—the frequency-domain interval of downlink dedicated pilots that are mapped to the same time domain is configured to be two subcarriers;

step S204: time-domain interval configuration process—the time-domain interval of downlink dedicated pilots that are mapped to different time domains is configured to be two or three OFDM symbols;

step S206: initial mapping process—the first downlink dedicated pilot is mapped to a specific position of a physical resource block, the specific position is also called the initial position which is represented by A and B, wherein, A is the frequency domain initial position, and B is the time domain initial position;

step S208: mapping process for other downlink dedicated pilots of the port—the mapping process is carried out according to the initial position, frequency-domain interval and time-domain interval of the first downlink dedicated pilot and the preset regulation.

The above-mentioned preset regulation is: twelve subcarriers are mapped to a physical resource block in the frequency domain, four downlink dedicated pilots of each port are mapped in the same time domain, and the downlink dedicated pilots are two subcarriers apart from each other. When there are multiple ports of downlink dedicated pilots, each port can be processed according to this method.

The process of each step mentioned above will be described in detail hereinafter:

Step S202: frequency-domain interval configuration process, which is also called frequency domain density configuration process.

It is determined in the present invention that, downlink dedicated pilots of each beamforming at an RB are two subcarriers apart from each other; when multiple RBs are transmitted together, frequency-domain density of dedicated pilots are distributed evenly, wherein the interval is two subcarriers.

The frequency-domain density of dedicated pilots is determined by coherent bandwidth, in order to avoid distortion of channel estimation, the lowest limit of pilot density is determined by a Nyquist sampling theorem. Because the frame structure of Extended CP is specially for the situation of large coverage, in which the frequency-selective fading of a channel becomes more serious, in order to further guarantee the performance of channel estimation, pilot symbols that are four times that adopted in the sampling theorem are adopted in the present invention, thus the frequency-domain interval of pilots S$_f$ is as shown in formula (1):

$$S_f = \frac{1}{4*2\Delta f \tau_{max}} = \frac{1}{4*2*15 \text{ kHz}*3700 \text{ ns}} \approx 2.5 \text{ subcarriers} \quad \text{formula (1)}$$

in formula (1), $\Delta f$ is a subcarrier interval, $\tau_{max}$ is a maximum channel delay, which can be referred to in 3GPP TR25.996. Therefore, dedicated pilots intervals of two subcarriers in the frequency domain can completely meet the requirement of channel estimation.

Step 204: time domain-interval configuration process, which is also called time domain density configuration process.

The time-domain density of pilot symbols is determined by coherent time, in order to avoid distortion of channel estimation, the lowest limit of pilot density is determined by the Nyquist sampling theorem. To further improve performance of channel estimation, pilot symbols that are four times that adopted in the sampling theorem are adopted in the present invention, thus the time-domain interval of pilots $S_t$ is as shown in formula (2):

$$S_t = \frac{1}{2*2f_d T_f} = \frac{1}{2*2*648 \text{ Hz} * \frac{1}{14} \text{ ms}} 5.4 \text{ OFDM symbols} \quad \text{formula (2)}$$

in formula (2), $f_d$ is a maximum Doppler frequency offset, it is regulated by LTE that the maximum moving speed of UE is 350 km/h, herein, $f_d$=648 Hz. $T_f$ is a time of OFDM symbol. Intervals between downlink dedicated pilots are two to three OFDM symbols, which can meet the requirement of channel estimation under high speed.

After the above-mentioned time-domain and frequency-domain intervals configuration processes, dedicated pilots are evenly distributed in both time domain and frequency domain, which can guarantee the quality of channel estimation.

Step S206: initial mapping process;

in this step, D is set to be the time domain initial position, while A is set to be: at the same position as the subcarrier where the first cell-specific reference signals of each OFDM symbol of the smallest physical resource block is located, namely, A is located at the same subcarrier as the first column of cell-specific reference signals of a resource block.

Preferably, A=1 and D=5, namely, the mapped initial position of the first downlink dedicated pilot in the frequency domain is set to be the first subcarrier, while the mapped position in the time domain is the $5^{th}$ OFDM symbol. This design of initial position of dedicated pilot is more reasonable than that raised previously in other methods for mapping dedicated pilots, with better performance under the same pilot overhead.

(1) Start Position in the Frequency Domain

The first row of downlink dedicated pilots of a beamforming starts from the first subcarrier in the frequency domain, start position of dedicated pilots and that of cell-specific reference signals are the same, beamforming weight-values are obtained by uplink or downlink cell-specific reference signals through estimating the real channels, so that pilots of adjacent positions will resume channel information more accurately.

(2) Start Position in the Time Domain

Start position of downlink dedicated pilots in the time domain is at the fifth OFDM symbol, so that the dedicated pilots are distributed evenly in a physical block, which can bring better channel estimating performance.

Step S208, in this step, four downlink dedicated pilots are mapped in the same time domain.

Frequency domain position of dedicated pilot is the same as that of the cell-specific reference signals, which is helpful to improve performance of channel estimation interpolation; and the consistency of channel information extraction and applied position during a beamforming procedure is guaranteed, which can reduce accumulated error.

1. According to the above-mentioned method, when there is one port of the downlink dedicated pilots corresponding to a single beam, the mapping method comprises:

the corresponding position of the initial position in the time domain is at the $5^{th}$ OFDM symbol, while the position in the frequency domain is set to be the same subcarrier of the first column of cell-specific reference signals in a physical resource block.

The physical resource block comprises twelve subcarriers in the frequency domain, which are the $1^{st}$ to $12^{th}$ subcarriers, as well as twelve OFDM symbols in the time domain, which are the $1^{st}$ to the $12^{th}$ OFDM symbols.

One port of twelve downlink dedicated pilots are divided into three groups in this mapping method, and each group comprises 4 downlink dedicated pilots that are located at the same OFDM symbol.

in the time domain, the first group of downlink dedicated pilots is mapped to the $5^{th}$ OFDM symbol in the time domain, the second group of downlink dedicated pilots is mapped to the $8^{th}$ OFDM symbol in the time domain, and the third group of downlink dedicated pilots is mapped to the $11^{th}$ or $12^{th}$ OFDM symbol in the time domain; or, the first group of downlink dedicated pilots is mapped to the $5^{th}$ OFDM symbol in the time domain, the second group of downlink dedicated pilots is mapped to the $9^{th}$ OFDM symbol in the time domain, and the third group of downlink dedicated pilots is mapped to the $12^{th}$ OFDM symbol in the time domain.

in the frequency domain, the $1^{st}$ one of four downlink dedicated pilots in one group is mapped to the $1^{st}$, $2^{nd}$ or $3_{rd}$ subcarrier in the frequency domain, while the $2^{nd}$ to $4^{th}$ downlink dedicated pilots are mapped to subcarriers that are two subcarriers apart from each other in order in the frequency domain.

Specifically:

the first downlink dedicated pilot is mapped to the $5^{th}$ OFDM symbol in the time domain, while to the $A^{th}$ subcarrier in the frequency domain; the second downlink dedicated pilot is mapped to the $5^{th}$ OFDM symbol in the time domain, while to the $(A+3)^{th}$ subcarrier in the frequency domain; the third downlink dedicated pilot is mapped to the $5^{th}$ OFDM symbol in the time domain, while to the $(A+6)^{th}$ subcarrier in the frequency domain; the fourth downlink dedicated pilot is mapped to the $5^{th}$ OFDM symbol in the time domain, while to the $(A+9)^{th}$ subcarrier in the frequency domain, wherein A=1, 2 or 3;

the fifth downlink dedicated pilot is mapped to the $8^{th}$ OFDM symbol in the time domain, while to the $B^{th}$ subcarrier in the frequency domain; the sixth downlink dedicated pilot is mapped to the $8^{th}$ OFDM symbol in the time domain, while to the $(B+3)^{th}$ subcarrier in the frequency domain; the seventh downlink dedicated pilot is mapped to the $8^{th}$ OFDM symbol in the time domain, while to the $(B+6)^{th}$ subcarrier in the frequency domain; the eighth downlink dedicated pilot is mapped to the $8^{th}$ OFDM symbol in the time domain, while to the $(B+9)^{th}$ subcarrier in the frequency domain, wherein B=1, 2 or 3;

the ninth downlink dedicated pilot is mapped to the $11^{th}$ or $12^{th}$ OFDM symbol in the time domain, while to the Oh subcarrier in the frequency domain; the tenth downlink dedicated pilot is mapped to the $11^{th}$ or $12^{th}$ OFDM symbol in the time domain, while to the $(C+3)^{th}$ subcarrier in the frequency domain; the eleventh downlink dedicated pilot is mapped to the $11^{th}$ or $12^{th}$ OFDM symbol in the time domain, while to the $(C+6)^{th}$ subcarrier in the frequency domain; the twelfth downlink dedicated pilot is mapped to the $11^{th}$ or $12^{th}$ OFDM symbol in the time domain, while to the $(C+9)^{th}$ subcarrier in the frequency domain, wherein C=1, 2 or 3.

A, B and C can be chosen from 1 to 3.

In addition, the fifth, sixth, seventh and eighth downlink dedicated pilots can also be mapped to the $9^{th}$ OFDM symbol in the time domain, and mapping in the frequency domain is the same as above. Accordingly, the ninth, tenth, eleventh and twelfth downlink dedicated pilots are mapped to the $12^{th}$ OFDM symbol in the time domain, and mapping in the frequency domain is the same as above.

The above-mentioned downlink dedicated pilots should be configured in a manner which avoids the cell-specific reference signals.

2. There are multiple ports of downlink dedicated pilots (generally no more than 3 ports), corresponding to multiple beams;

corresponding positions in the time domain of all ports' initial positions are same, located at the $5^{th}$ OFDM symbol, while corresponding positions in the frequency domain are staggered (frequency-domain position of the first port's initial position can be set to the same subcarrier as that of the first column of cell-specific reference signals in a physical resource block, while initial positions of other ports are staggered with that of the first).

According to the above steps and design principle, method of the present invention will be further illustrated in detail with reference to some embodiments hereinafter:

Embodiment 1 as shown in FIG. 3, since A=1 and D=5, in this embodiment of the present invention, downlink dedicated pilots are mapped to the $5^{th}$, $8^{th}$ and $11^{th}$ OFDM symbols respectively in the time domain.

On such a basis, the operation in step S208 of mapping other downlink dedicated pilots is specifically:

the second downlink dedicated pilot is mapped to the $5^{th}$ OFDM symbol in the time domain, while to the $(A+3=4)^{th}$ subcarrier in the frequency domain;

the third downlink dedicated pilot is mapped to the $5^{th}$ OFDM symbol in the time domain, while to the $(A+6=7)^{th}$ subcarrier in the frequency domain;

the fourth downlink dedicated pilot is mapped to the $5^{th}$ OFDM symbol in the time domain, while to the $(A+9=10)^{th}$ subcarrier in the frequency domain;

the fifth downlink dedicated pilot is mapped to the $8^{th}$ OFDM symbol in the time domain, while to the $(B=3)^{th}$ subcarrier in the frequency domain;

the sixth downlink dedicated pilot is mapped to the $8^{th}$ OFDM symbol in the time domain, while to the $(B+3=6)^{th}$ subcarrier in the frequency domain;

the seventh downlink dedicated pilot is mapped to the $8^{th}$ OFDM symbol in the time domain, while to the $(B+6=9)^{th}$ subcarrier in the frequency domain;

the eighth downlink dedicated pilot is mapped to the $8^{th}$ OFDM symbol in the time domain, while to the $(B+9=12)^{th}$ subcarrier in the frequency domain;

the ninth downlink dedicated pilot is mapped to the $11^{th}$ OFDM symbol in the time domain, while to the $(C=1)^{th}$ subcarrier in the frequency domain;

the tenth downlink dedicated pilot is mapped to the $11^{th}$ OFDM symbol in the time domain, while to the $(C+3=4)^{th}$ subcarrier in the frequency domain;

the eleventh downlink dedicated pilot is mapped to the $11^{th}$ OFDM symbol in the time domain, while to the $(C+6=7)^{th}$ subcarrier in the frequency domain;

the twelfth downlink dedicated pilot is mapped to the $11^{th}$ OFDM symbol in the time domain, while to the $(C+9=10)^{th}$ subcarrier in the frequency domain.

Embodiment 2 as shown in FIG. 4, since A=1 and B=5, in this embodiment of the present invention, downlink dedicated pilots are mapped to the $5^{th}$, $8^{th}$ and $12^{th}$ OFDM symbols respectively in the time domain.

On such a basis, the operation in step S208 of mapping other downlink dedicated pilots is specifically:

the second downlink dedicated pilot is mapped to the $5^{th}$ OFDM symbol in the time domain, while to the $(A+3=4)^{th}$ subcarrier in the frequency domain;

the third downlink dedicated pilot is mapped to the $5^{th}$ OFDM symbol in the time domain, while to the $(A+6=7)^{th}$ subcarrier in the frequency domain;

the fourth downlink dedicated pilot is mapped to the $5^{th}$ OFDM symbol in the time domain, while to the $(A+9=10)^{th}$ subcarrier in the frequency domain;

the fifth downlink dedicated pilot is mapped to the $8^{th}$ OFDM symbol in the time domain, while to the $(A=1)^{th}$ subcarrier in the frequency domain;

the sixth downlink dedicated pilot is mapped to the $8^{th}$ OFDM symbol in the time domain, while to the $(A+3=4)^{th}$ subcarrier in the frequency domain;

the seventh downlink dedicated pilot is mapped to the $8^{th}$ OFDM symbol in the time domain, while to the $(A+6=7)^{th}$ subcarrier in the frequency domain;

the eighth downlink dedicated pilot is mapped to the $8^{th}$ OFDM symbol in the time domain, while to the $(A+9=10)^{th}$ subcarrier in the frequency domain;

the ninth downlink dedicated pilot is mapped to the $12^{th}$ OFDM symbol in the time domain, while to the $(A=1)^{th}$ subcarrier in the frequency domain;

the tenth downlink dedicated pilot is mapped to the $12^{th}$ OFDM symbol in the time domain, while to the $(A+3=4)^{th}$ subcarrier in the frequency domain;

the eleventh downlink dedicated pilot is mapped to the $12^{th}$ OFDM symbol in the time domain, while to the $(A+6=7)^{th}$ subcarrier in the frequency domain;

the twelfth downlink dedicated pilot is mapped to the $12^{th}$ OFDM symbol in the time domain, while to the $(A+9=10)^{th}$ subcarrier in the frequency domain.

Embodiment 3 as shown in FIG. 5, since A=1 and D=5, in this embodiment of the present invention, downlink dedicated pilots are mapped to the $5^{th}$, $9^{th}$ and $12^{th}$ OFDM symbols respectively in the time domain.

On such a basis, the operation in step S208 of mapping other downlink dedicated pilots is specifically:

the second downlink dedicated pilot is mapped to the $5^{th}$ OFDM symbol in the time domain, while to the $(A+3=4)^{th}$ subcarrier in the frequency domain;

the third downlink dedicated pilot is mapped to the $5^{th}$ OFDM symbol in the time domain, while to the $(A+6=7)^{th}$ subcarrier in the frequency domain;

the fourth downlink dedicated pilot is mapped to the $5^{th}$ OFDM symbol in the time domain, while to the $(A+9=10)^{th}$ subcarrier in the frequency domain;

the fifth downlink dedicated pilot is mapped to the $9^{th}$ OFDM symbol in the time domain, while to the $(B=3)^{th}$ subcarrier in the frequency domain;

the sixth downlink dedicated pilot is mapped to the $9^{th}$ OFDM symbol in the time domain, while to the $(B+3=6)^{th}$ subcarrier in the frequency domain;

the seventh downlink dedicated pilot is mapped to the $9^{th}$ OFDM symbol in the time domain, while to the $(B+6=9)^{th}$ subcarrier in the frequency domain;

the eighth downlink dedicated pilot is mapped to the $9^{th}$ OFDM symbol in the time domain, while to the $(B+9=12)^{th}$ subcarrier in the frequency domain;

the ninth downlink dedicated pilot is mapped to the 12$^{th}$ OFDM symbol in the time domain, while to the (C=1)$^{th}$ subcarrier in the frequency domain;

the tenth downlink dedicated pilot is mapped to the 12$^{th}$ OFDM symbol in the time domain, while to the (C+3=4)$^{th}$ subcarrier in the frequency domain;

the eleventh downlink dedicated pilot is mapped to the 12$^{th}$ OFDM symbol in the time domain, while to the (C+6=7)$^{th}$ subcarrier in the frequency domain;

the twelfth downlink dedicated pilot is mapped to the 12$^{th}$ OFDM symbol in the time domain, while to the (C+9=10)$^{th}$ subcarrier in the frequency domain.

Embodiment 4 as shown in FIG. 6, since A=1 and D=5, in this embodiment of the present invention, downlink dedicated pilots are mapped to the 5$^{th}$, 8$^{th}$ and 12$^{th}$ OFDM symbols respectively in the time domain.

On such a basis, the operation in step S208 of mapping other downlink dedicated pilots is specifically:

the second downlink dedicated pilot is mapped to the 5$^{th}$ OFDM symbol in the time domain, while to the (A+3=4)$^{th}$ subcarrier in the frequency domain;

the third downlink dedicated pilot is mapped to the 5$^{th}$ OFDM symbol in the time domain, while to the (A+6=7)$^{th}$ subcarrier in the frequency domain;

the fourth downlink dedicated pilot is mapped to the 5$^{th}$ OFDM symbol in the time domain, while to the (A+9=10)$^{th}$ subcarrier in the frequency domain;

the fifth downlink dedicated pilot is mapped to the 8$^{th}$ OFDM symbol in the time domain, while to the (B=3)$^{th}$ subcarrier in the frequency domain;

the sixth downlink dedicated pilot is mapped to the 8$^{th}$ OFDM symbol in the time domain, while to the (B+3=6)$^{th}$ subcarrier in the frequency domain;

the seventh downlink dedicated pilot is mapped to the 8$^{th}$ OFDM symbol in the time domain, while to the (B+6=9)$^{th}$ subcarrier in the frequency domain;

the eighth downlink dedicated pilot is mapped to the 8$^{th}$ OFDM symbol in the time domain, while to the (B+9=12)$^{th}$ subcarrier in the frequency domain;

the ninth downlink dedicated pilot is mapped to the 12$^{th}$ OFDM symbol in the time domain, while to the (C=1)$^{th}$ subcarrier in the frequency domain;

the tenth downlink dedicated pilot is mapped to the 12$^{th}$ OFDM symbol in the time domain, while to the (C+3=4)$^{th}$ subcarrier in the frequency domain;

the eleventh downlink dedicated pilot is mapped to the 12$^{th}$ OFDM symbol in the time domain, while to the (C+6=7)$^{th}$ subcarrier in the frequency domain;

the twelfth downlink dedicated pilot is mapped to the 12$^{th}$ OFDM symbol in the time domain, while to the (C+9=10)$^{th}$ subcarrier in the frequency domain.

Embodiment 5 as shown in FIG. 7, since A=1 and D=5, in this embodiment of the present invention, downlink dedicated pilots are mapped to the 5$^{th}$, 8$^{th}$ and 11$^{th}$ OFDM symbols respectively in the time domain.

On such a basis, the operation in step S208 of mapping other downlink dedicated pilots is specifically:

the second downlink dedicated pilot is mapped to the 5$^{th}$ OFDM symbol in the time domain, while to the (A+3=4)$^{th}$ subcarrier in the frequency domain;

the third downlink dedicated pilot is mapped to the 5$^{th}$ OFDM symbol in the time domain, while to the (A+6=7)$^{th}$ subcarrier in the frequency domain;

the fourth downlink dedicated pilot is mapped to the 5$^{th}$ OFDM symbol in the time domain, while to the (A+9=10)$^{th}$ subcarrier in the frequency domain;

the fifth downlink dedicated pilot is mapped to the 8$^{th}$ OFDM symbol in the time domain, while to the (B=2)$^{th}$ subcarrier in the frequency domain;

the sixth downlink dedicated pilot is mapped to the 8$^{th}$ OFDM symbol in the time domain, while to the (B+3=5)$^{th}$ subcarrier in the frequency domain;

the seventh downlink dedicated pilot is mapped to the 8$^{th}$ OFDM symbol in the time domain, while to the (B+6=8)$^{th}$ subcarrier in the frequency domain;

the eighth downlink dedicated pilot is mapped to the 8$^{th}$ OFDM symbol in the time domain, while to the (B+9=11)$^{th}$ subcarrier in the frequency domain;

the ninth downlink dedicated pilot is mapped to the 11$^{th}$ OFDM symbol in the time domain, while to the (C=3)$^{th}$ subcarrier in the frequency domain;

the tenth downlink dedicated pilot is mapped to the 11$^{th}$ OFDM symbol in the time domain, while to the (C+3=6)$^{th}$ subcarrier in the frequency domain;

the eleventh downlink dedicated pilot is mapped to the 11$^{th}$ OFDM symbol in the time domain, while to the (C+6=9)$^{th}$ subcarrier in the frequency domain;

the twelfth downlink dedicated pilot is mapped to the 11$^{th}$ OFDM symbol in the time domain, while to the (C+9=12)$^{th}$ subcarrier in the frequency domain.

Embodiment 6 as shown in FIG. 8, since A=1 and D=5, in this embodiment of the present invention, downlink dedicated pilots are mapped to the 5$^{th}$, 8$^{th}$ and 11$^{th}$ OFDM symbols respectively in the time domain.

On such a basis, the operation in step S208 of mapping other downlink dedicated pilots is specifically:

the second downlink dedicated pilot is mapped to the 5$^{th}$ OFDM symbol in the time domain, and to the (A+3=4)$^{th}$ subcarrier in the frequency domain;

the third downlink dedicated pilot is mapped to the 5$^{th}$ OFDM symbol in the time domain, while to the (A+6=7)$^{th}$ subcarrier in the frequency domain;

the fourth downlink dedicated pilot is mapped to the 5$^{th}$ OFDM symbol in the time domain, while to the (A+9=10)$^{th}$ subcarrier in the frequency domain;

the fifth downlink dedicated pilot is mapped to the 8$^{th}$ OFDM symbol in the time domain, while to the (B=1)$^{th}$ subcarrier in the frequency domain;

the sixth downlink dedicated pilot is mapped to the 8$^{th}$ OFDM symbol in the time domain, while to the (B+3=4)$^{th}$ subcarrier in the frequency domain;

the seventh downlink dedicated pilot is mapped to the 8$^{th}$ OFDM symbol in the time domain, while to the (B+6=7)$^{th}$ subcarrier in the frequency domain;

the eighth downlink dedicated pilot is mapped to the 8$^{th}$ OFDM symbol in the time domain, while to the (B+9=10)$^{th}$ subcarrier in the frequency domain;

the ninth downlink dedicated pilot is mapped to the 11$^{th}$ OFDM symbol in the time domain, while to the (C=1)$^{th}$ subcarrier in the frequency domain;

the tenth downlink dedicated pilot is mapped to the 11$^{th}$ OFDM symbol in the time domain, while to the (C+3=4)$^{th}$ subcarrier in the frequency domain;

the eleventh downlink dedicated pilot is mapped to the 11$^{th}$ OFDM symbol in the time domain, while to the (C+6=7)$^{th}$ subcarrier in the frequency domain;

the twelfth downlink dedicated pilot is mapped to the 11$^{th}$ OFDM symbol in the time domain, while to the (C+9=10)$^{th}$ subcarrier in the frequency domain.

It can be seen from the above description that, in the present invention, by presetting the frequency-domain interval and time-domain interval, and by determining the position of the first downlink dedicated pilot (start position in the frequency domain and start position in the time domain), and according to the preset regulation, the position of a pilot symbol in a physical resource block can be determined.

The downlink dedicated pilot structure supports any number of antennas as well as a single layer beamforming of antenna spacing. Downlink dedicated pilots are distinguished by beams, and the present invention concerns itself with a single-beamforming, so the dedicated pilot structure provided by embodiments of the present invention comprises only one port of dedicated pilots, as to those skilled in the art, the situation of multiple beams can be deduced according to relevant pilot density, for example, two ports of dedicated pilots are adopted in two beams, and the rest can be done in the same manner.

The present invention is not limited to the above described exemplary embodiments. For those skilled in the art, various modifications and changes can be made to the present invention. Any modification, equivalent substitute and improvement within the spirit of the present invention is deemed to be included within the scope of the present invention, as defined by the claims.

What is claimed is:

1. A method for mapping downlink dedicated pilots to resource elements in an Extended Cyclic Prefix (Extended CP) frame, applied in a Long Term Evolution (LTE) system, comprising:
mapping the first downlink dedicated pilot of a port to the 5$^{th}$ orthogonal frequency division multiplexing symbol of a physical resource block in the time domain, and to the A$^{th}$ subcarrier in the frequency domain; wherein the physical resource block comprises 12 subcarriers in the frequency domain and 12 orthogonal frequency division multiplexing symbols in the time domain, and wherein A is 1 or 2 or 3;
mapping the second downlink dedicated pilot to the 5$^{th}$ orthogonal frequency division multiplexing symbol in the time domain, and to the (A+3)$^{th}$ subcarrier in the frequency domain;
mapping the third downlink dedicated pilot to the 5$^{th}$ orthogonal frequency division multiplexing symbol in the time domain, and to the (A+6)$^{th}$ subcarrier in the frequency domain;
mapping the fourth downlink dedicated pilot to the 5$^{th}$ orthogonal frequency division multiplexing symbol in the time domain, and to the (A+9)$^{th}$ subcarrier in the frequency domain;
mapping the fifth downlink dedicated pilot to the 8$^{th}$ orthogonal frequency division multiplexing symbol in the time domain, and to the B$^{th}$ subcarrier in the frequency domain; wherein, B is 1 or 2 or 3;
mapping the sixth downlink dedicated pilot to the 8$^{th}$ orthogonal frequency division multiplexing symbol in the time domain, and to the (B+3)$^{th}$ subcarrier in the frequency domain;
mapping the seventh downlink dedicated pilot to the 8$^{th}$ orthogonal frequency division multiplexing symbol in the time domain, and to the (B+6)$^{th}$ subcarrier in the frequency domain;
mapping the eighth downlink dedicated pilot to the 8$^{th}$ orthogonal frequency division multiplexing symbol in the time domain, and to the (B+9)$^{th}$ subcarrier in the frequency domain;
mapping the ninth downlink dedicated pilot to the 12$^{th}$ orthogonal frequency division multiplexing symbol in the time domain, and to the C$^{th}$ subcarrier in the frequency domain; wherein, C is 1 or 2 or 3;
mapping the tenth downlink dedicated pilot to the 12$^{th}$ orthogonal frequency division multiplexing symbol in the time domain, and to the (C+3)$^{th}$ subcarrier in the frequency domain;
mapping the eleventh downlink dedicated pilot to the 12$^{th}$ orthogonal frequency division multiplexing symbol in the time domain, and to the (C+6)$^{th}$ subcarrier in the frequency domain;
mapping the twelfth downlink dedicated pilot to the 12$^{th}$ orthogonal frequency division multiplexing symbol in the time domain, and to the (C+9)$^{th}$ subcarrier in the frequency domain; and
transmitting the Extended CP frame with the downlink dedicated pilots to a user equipment;
wherein, only one port of downlink dedicated pilots is transmitted in the physical resource block.

2. A method for mapping downlink dedicated pilots to resource elements in an Extended Cyclic Prefix (Extended CP) frame, applied in a Long Term Evolution (LTE) system, comprising:
dividing a port of twelve downlink dedicated pilots into three groups, each group comprising four downlink dedicated pilots that are located at a same orthogonal frequency division multiplexing symbol of a physical resource block; wherein the physical resource block comprises 12 subcarriers in the frequency domain and 12 orthogonal frequency division multiplexing symbols in the time domain;
in the time domain, mapping the first group of downlink dedicated pilots to the 5$^{th}$ orthogonal frequency division multiplexing symbol in the time domain; mapping the second group of downlink dedicated pilots to the 8$^{th}$ orthogonal frequency division multiplexing symbol in the time domain; and mapping the third group of downlink dedicated pilots to the 11$^{th}$ or 12$^{th}$ orthogonal frequency division multiplexing symbol in the time domain;
in the frequency domain, mapping the 1$^{st}$ one of 4 downlink dedicated pilots in each group to the 1$^{st}$ or 2$^{nd}$ or 3$^{rd}$ subcarrier in the frequency domain, and mapping the 2$^{nd}$ to 4$^{th}$ downlink dedicated pilots to subcarriers that are two subcarriers apart from each other in order in the frequency domain; and
transmitting the Extended CP frame with the downlink dedicated pilots to a user equipment;
wherein, only one port of downlink dedicated pilots is transmitted in the physical resource block.

3. A method for mapping downlink dedicated pilots to resource elements in an Extended Cyclic Prefix (Extended CP) frame, applied in a Long Term Evolution (LTE) system, comprising:
dividing a port of twelve downlink dedicated pilots into three groups, each group comprising four downlink dedicated pilots that are located at the same orthogonal frequency division multiplexing symbol of a physical resource block; wherein the physical resource block comprises 12 subcarriers in the frequency domain and 12 orthogonal frequency division multiplexing symbols in the time domain;

in the time domain, mapping the first group of downlink dedicated pilots to the $5^{th}$ orthogonal frequency division multiplexing symbol in the time domain; mapping the second group of downlink dedicated pilots to the $9^{th}$ orthogonal frequency division multiplexing symbol in the time domain; and mapping the third group of downlink dedicated pilots to the $12^{th}$ orthogonal frequency division multiplexing symbol in the time domain;

in the frequency domain, mapping the $1^{st}$ one of four downlink dedicated pilots in each group to the $1^{st}$, $2^{nd}$ or $3^{rd}$ subcarrier in the frequency domain, and mapping the $2^{nd}$ to $4^{th}$ downlink dedicated pilots to subcarriers that are two subcarriers apart from each other in order in the frequency domain; and transmitting the Extended CP frame with the downlink dedicated pilots to a user equipment;

wherein, only one port of downlink dedicated pilots is transmitted in the physical resource block.

4. The mapping method according to claim 2, wherein:

the $1^{st}$, $2^{nd}$, $3^{rd}$, $4^{th}$ downlink dedicated pilots are all mapped to the $5^{th}$ OFDM symbol in the time domain, and to the $1^{st}$, $4^{th}$, $7^{th}$, $10^{th}$ subcarriers sequentially in the frequency domain;

the $5^{th}$, $6^{th}$, $7^{th}$, $8^{th}$ downlink dedicated pilots are all mapped to the $8^{th}$ OFDM symbol in the time domain, and to the $1^{st}$, $4^{th}$, $7^{th}$, $10^{th}$ subcarriers sequentially in the frequency domain, or to the $3^{rd}$, $6^{th}$, $9^{th}$, $12^{th}$ subcarriers sequentially in the frequency domain;

the $9^{th}$, $10^{th}$, $11^{th}$, $12^{th}$ downlink dedicated pilots are all mapped to the $11^{th}$ or $12^{th}$ OFDM symbol in the time domain, and to the $1^{st}$, $4^{th}$, $7^{th}$, $10^{th}$ subcarriers sequentially in the frequency domain.

5. The mapping method according to claim 2, wherein:

the $1^{st}$, $2^{nd}$, $3^{rd}$, $4^{th}$ dedicated pilots are all mapped to the $5^{th}$ OFDM symbol in the time domain, and to the $1^{st}$, $4^{th}$, $7^{th}$, $10^{th}$ subcarriers sequentially in the frequency domain;

the $5^{th}$, $6^{th}$, $7^{th}$, $8^{th}$ downlink dedicated pilots are all mapped to the $8^{th}$ OFDM symbol in the time domain, and to the $2^{nd}$, $5^{th}$, $8^{th}$, $11^{th}$ subcarriers sequentially in the frequency domain;

the $9^{th}$, $10^{th}$, $11^{th}$, $12^{th}$ downlink dedicated pilots are all mapped to the $11^{th}$ or $12^{th}$ OFDM symbol in the time domain, and to the $3^{rd}$, $6^{th}$, $9^{th}$, $12^{th}$ subcarriers sequentially in the frequency domain.

6. The mapping method according to claim 3, wherein:

the $1^{st}$, $2^{nd}$, $3^{rd}$, $4^{th}$ downlink dedicated pilots are all mapped to the $5^{th}$ OFDM symbol in the time domain, and to the $1^{st}$, $4^{th}$, $7^{th}$, $10^{th}$ subcarriers sequentially in the frequency domain;

the $5^{th}$, $6^{th}$, $7^{th}$, $8^{th}$ downlink dedicated pilots are all mapped to the $9^{th}$ OFDM symbol in the time domain, and to the $3^{rd}$, $6^{th}$, $9^{th}$, $12^{th}$ subcarriers sequentially in the frequency domain;

the $9^{th}$, $10^{th}$, $11^{th}$, $12^{th}$ downlink dedicated pilots are all mapped to the $12^{th}$ OFDM symbol in the time domain, and to the $1^{st}$, $4^{th}$, $7^{th}$, $10^{th}$ subcarriers sequentially in the frequency domain.

* * * * *